United States Patent
Sugimoto et al.

(10) Patent No.: US 8,757,915 B2
(45) Date of Patent: Jun. 24, 2014

(54) ADAPTER UNIT

(75) Inventors: Hideo Sugimoto, Tokyo (JP); Hideto Shimazu, Tokyo (JP); Yuichi Koreeda, Tokyo (JP)

(73) Assignee: Japan Aviation Electronics Industry, Limited, Tokyo (JP)

(*) Notice: Subject to any disclaimer, the term of this patent is extended or adjusted under 35 U.S.C. 154(b) by 1131 days.

(21) Appl. No.: 12/576,454

(22) Filed: Oct. 9, 2009

(65) Prior Publication Data
US 2010/0104355 A1 Apr. 29, 2010

(30) Foreign Application Priority Data
Oct. 28, 2008 (JP) .................................. 2008-276780

(51) Int. Cl.
*F16B 7/00* (2006.01)
(52) U.S. Cl.
USPC ............... 403/13; 439/252; 439/380; 385/60
(58) Field of Classification Search
USPC ................... 403/1, 13, 14, 383; 385/55, 60; 439/252, 380, 378; 285/396, 401, 402, 285/361
See application file for complete search history.

(56) References Cited

U.S. PATENT DOCUMENTS

| | | | |
|---|---|---|---|
| 6,422,759 B1* | 7/2002 | Kevern | 385/60 |
| 6,960,025 B2* | 11/2005 | Gurreri | 385/58 |
| 7,004,668 B2* | 2/2006 | Lombardo et al. | 403/293 |
| 7,510,439 B2* | 3/2009 | Gordon et al. | 439/607.41 |
| 7,909,658 B2* | 3/2011 | Pfaffenbach | 439/680 |
| D637,974 S * | 5/2011 | Canning | D13/154 |
| 7,985,027 B2* | 7/2011 | Lewallen et al. | 385/78 |
| 8,137,002 B2* | 3/2012 | Lu et al. | 385/78 |
| 8,262,312 B2* | 9/2012 | Laisement et al. | 403/379.4 |
| 8,408,815 B2* | 4/2013 | Lin et al. | 385/88 |
| 8,414,196 B2* | 4/2013 | Lu et al. | 385/60 |
| 2006/0034650 A1* | 2/2006 | Appleyard et al. | 403/14 |
| 2006/0088247 A1* | 4/2006 | Tran et al. | 385/55 |
| 2006/0193562 A1* | 8/2006 | Theuerkorn | 385/53 |
| 2007/0172172 A1* | 7/2007 | Theuerkorn et al. | 385/53 |

FOREIGN PATENT DOCUMENTS

JP 2007-323905 A 12/2007

* cited by examiner

*Primary Examiner* — Joshua Kennedy
(74) *Attorney, Agent, or Firm* — Holtz Holtz Goodman & Chick PC (57) ABSTRACT

An adapter unit capable of preventing breakage of a positioning key for accurately connecting first and adapters. A key is formed on an inner peripheral surface of a hollow cylindrical portion of a receptacle adapter such that a front end thereof is rearward of a front end of the hollow cylindrical portion. Projecting portions are formed on the inner peripheral surface of the hollow cylindrical portion at locations away from the key in a circumferential direction, for receiving a front end of a hollow cylindrical portion of a plug adapter inserted into the hollow cylindrical portion of the receptacle adapter. Receiving portions are formed on an outer peripheral surface of the hollow cylindrical portion of the plug adapter, for receiving the projecting portions. The front end of the key is rearward of the front end of each projecting portion.

1 Claim, 6 Drawing Sheets

ADAPTER UNIT

BACKGROUND OF THE INVENTION

1. Field of the Invention

This invention relates to an adapter unit, and more particularly to an adapter unit which is comprised of a first adapter and a second adapter.

2. Description of the Related Art

Conventionally, there has been proposed a connector comprised of a first hollow cylinder wall, connector terminals, a seal member, and a seal member holder (see Japanese Laid-Open Patent Publication (Kokai) No. 2007-323905).

The first hollow cylinder wall is formed on a wall of a case which accommodates electrical components in a sealed state. The first hollow cylinder wall has an outer peripheral surface formed with eight engaging protrusions at equally-spaced intervals in a circumferential direction. Further, the outer peripheral surface of the first hollow cylinder wall is formed with first and second positioning ribs. Each of the first and second positioning ribs is at an intermediate location between the two adjacent engaging protrusions. Although a foremost end of the first positioning rib has a fixed width, a rear end of the first positioning rib is not uniform in width, but becomes wider as closer to the rearmost end. The second positioning rib has a fixed width, which is the same as that of the foremost end of the first positioning rib. The first positioning rib and the second positioning rib are separately placed from each other by 90 degrees in the circumferential direction of the first hollow cylinder wall.

The seal member holder includes a second hollow cylinder wall, and a third hollow cylinder wall that has a smaller diameter than that of the second hollow cylinder wall, and is concentrically connected to the second cylindrical wall. The second hollow cylinder wall is formed with engaging holes at equally-spaced intervals in the circumferential direction, which are engaged with the engaging protrusions on the first hollow cylinder wall. The engaging holes are away from an end edge of the second hollow cylinder wall. Four groove-like cutouts are formed in an outer peripheral surface of the second hollow cylinder wall at equally-spaced intervals in the circumferential direction. Two of the four cutouts are first and second positioning cutouts which are capable of being fitted to the first and second positioning ribs. A width of the first positioning cutout corresponds to that of the first positioning rib. A width of the second positioning cutout corresponds to that of the second positioning rib.

To assemble this connector, first, the connector terminals and the seal member are disposed inside the first hollow cylinder wall. A gap between the connector terminals and the wall of the case is sealed with the seal member.

Next, the foremost end of the second hollow cylinder wall of the seal member holder is mounted on the first hollow cylinder wall, and the seal member holder is turned. When the first positioning cutout matches the first positioning rib, and the second positioning cutout matches the second positioning rib, the seal member holder is pushed toward the wall of the case, whereby the entire seal member holder is mounted on the first hollow cylinder wall.

To accurately fit the first hollow cylinder wall and the second hollow cylinder wall, it is required to mount the second hollow cylinder wall on the first hollow cylinder wall, and turn the second hollow cylinder wall until the first and second positioning cutouts and the first and second positioning ribs match each other, as described above. However, when the first and second positioning cutouts pass the first and second positioning ribs, there is a fear that the foremost ends of the first and second positioning ribs are caught in the first and second positioning cutouts, causing breakage of the foremost ends of the first and second positioning ribs.

SUMMARY OF THE INVENTION

The present invention has been made in view of these circumstances, and an object thereof is to provide an adapter unit which is capable of preventing breakage of a positioning key for accurately fitting a first adapter and a second adapter to each other.

To attain the above object, the present invention provides an adapter unit comprising a first adapter, the first adapter having a first hollow cylindrical portion, and at least one key formed on an inner peripheral surface of the first hollow cylindrical portion, and a plurality of projecting portions formed on the inner peripheral surface of the first hollow cylindrical portion, at respective locations circumferentially away from the key, the key having a front end at a location rearward of a front end of the first hollow cylindrical portion, and a front end of each projecting portion, and a second adapter, the second adapter having a second hollow cylindrical portion for being inserted into the first hollow cylindrical portion, a key groove formed in an outer peripheral surface of the second hollow cylindrical portion, for being fitted to the key, and receiving portions formed on the outer peripheral surface of the second hollow cylindrical portion, for receiving the projecting portions, the second hollow cylindrical portion having a front end for being received by the projecting portions when the second hollow cylindrical portion is inserted into the first hollow cylindrical portion.

When connecting the first adapter and the second adapter, it is required to insert the second hollow cylindrical portion into the first hollow cylindrical portion, and turn the second hollow cylindrical portion until the key matches the key groove. However, the front end of the key is located rearward of the foremost end of each projecting portion, and hence the foremost end of the second hollow cylindrical portion inserted into the first hollow cylindrical portion is supported in a manner slidable by the projecting portions on the inner peripheral surface of the first hollow cylindrical portion, and is not brought into contact with the front end of the key. Therefore, this prevents the positioning key from being broken by the foremost end of the second hollow cylindrical portion. Further, when the projecting portions of the first hollow cylindrical portion and the receiving portions of the second hollow cylindrical portion are caused to match each other by turning of the second hollow cylindrical portion, the key and the key groove also match each other, so that the projecting portions are accommodated in the receiving portions, and the key is fitted in the key groove. This causes the first adapter and the second adapter to be accurately connected.

Preferably, the projecting portions are on the inner peripheral surface of the first hollow cylindrical portion at two locations line-symmetrical with a central axis of the first hollow cylindrical portion, and the key is at an intermediate location between the projecting portions at the two locations.

More preferably, the projecting portions at the two locations are formed respective flat surface, and the flat surfaces are opposed to each other, and one-side surfaces of respective connector housings at opposite ends, out of a plurality of connector housings each having a rectangular cross-section, which are inserted in a rear end of the first hollow cylindrical portion and are arranged in a radial direction, are supported by rear portions of the flat surfaces of the projecting portions.

According to the present invention, it is possible to prevent breakage of the positioning key for accurately fitting the first adapter and the second adapter.

The above and other objects, features and advantages of the present invention will become more apparent from the following detailed description taken in conjunction with the accompanying drawings.

DETAILED DESCRIPTION OF THE PREFERRED EMBODIMENTS

Hereafter, an adapter unit according to an embodiment of the present invention will be described with reference to FIGS. 1 to 5.

Figure 1:
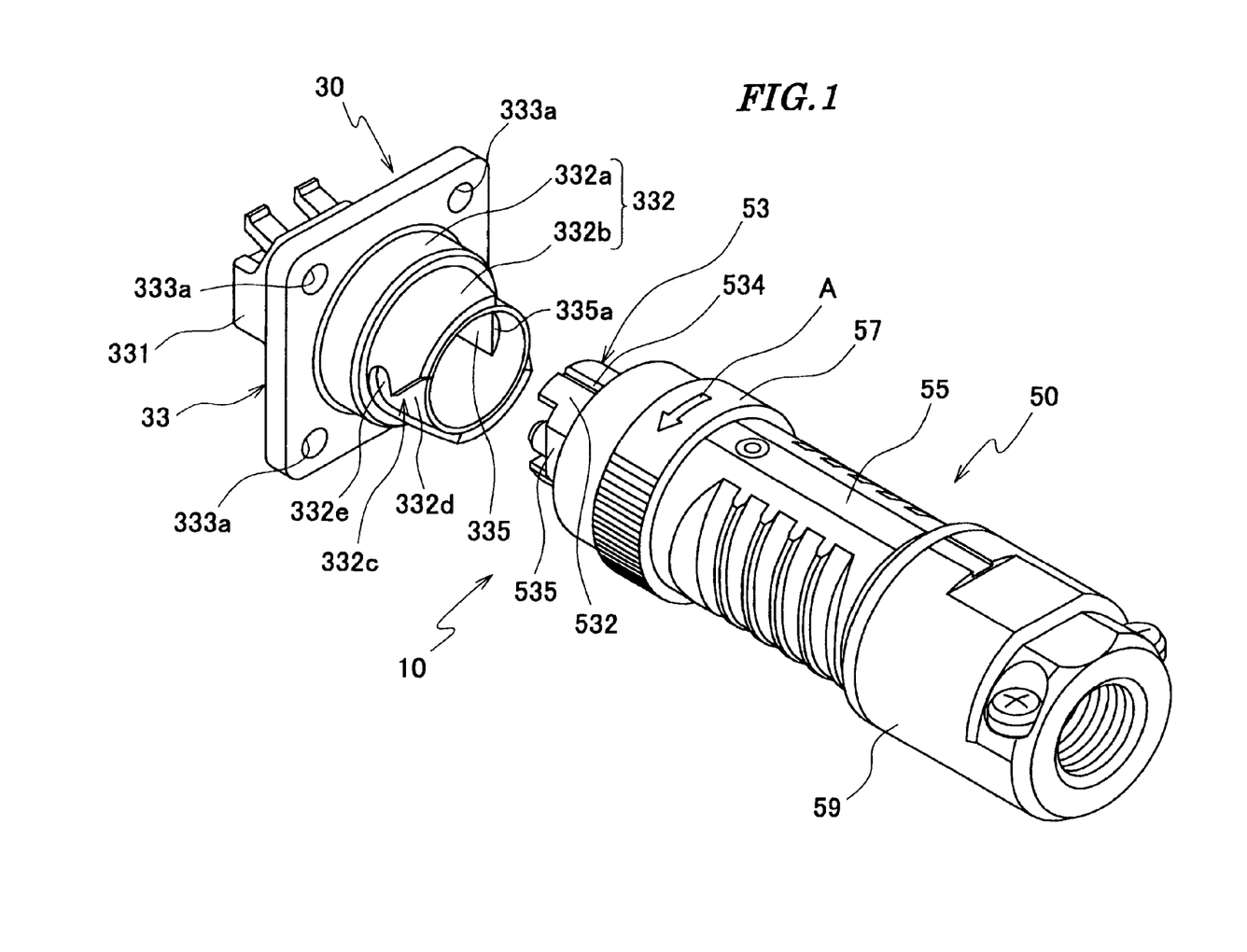
FIG. 1 is a perspective view of an adapter unit according to an embodiment of the present invention in a state before fitting.

As shown in FIG. 1, an adapter unit 10 is comprised of a receptacle adapter (first adapter) 30, and a plug adapter (second adapter) 50 which is capable of being fitted to the receptacle adapter 30. The receptacle adapter 30 is connected to an optical fiber cable, not shown, via optical connectors 41 (see FIG. 2), referred to hereinafter. The receptacle adapter 30 is fixed e.g. to a casing of an electronic apparatus, not shown. The plug adapter 50 is connected to an optical fiber cable, not shown, via optical connectors, not shown, referred to hereinafter. The adapter unit 10 connects optical connectors to each other.

The receptacle adapter 30 has a housing 33.

Figure 2:
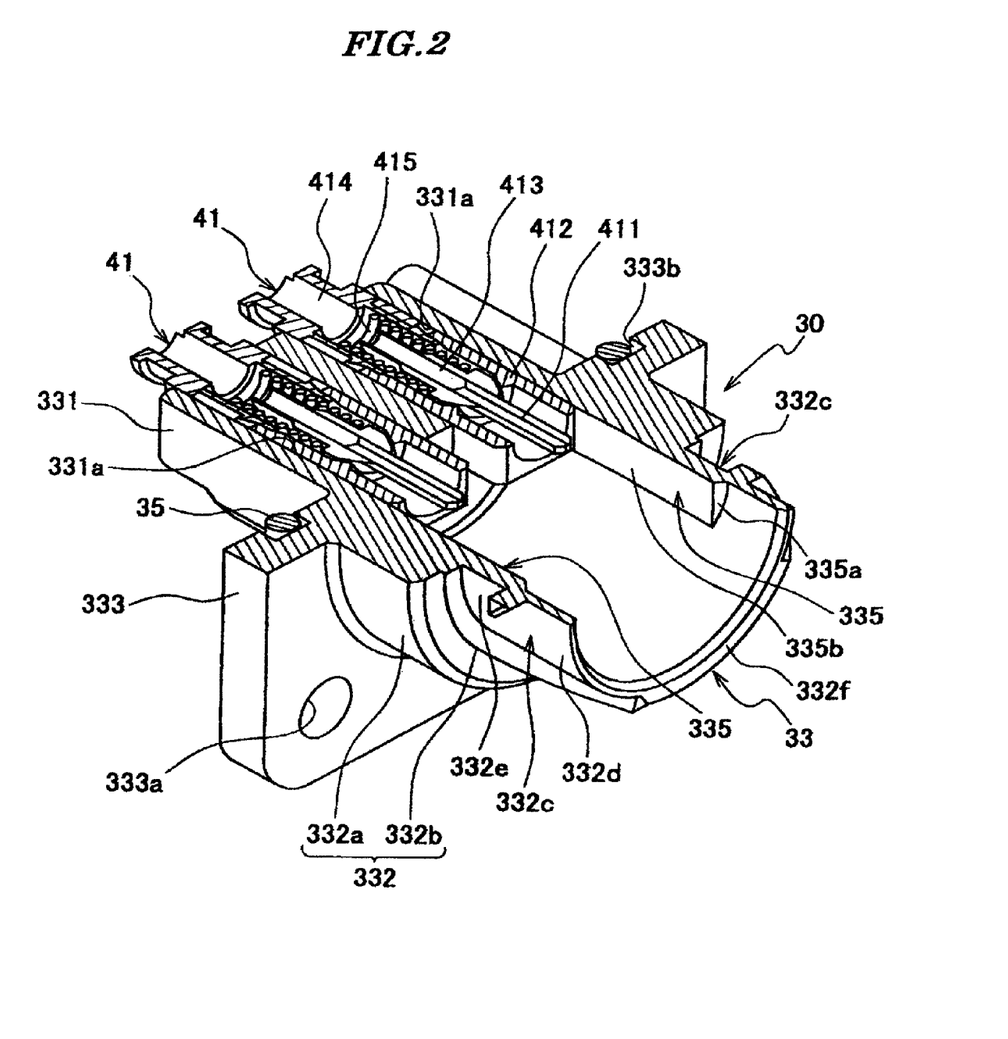
FIG. 2 is a cross-sectional view of a receptacle adapter of the adapter unit shown in FIG. 1.
Figure 3:
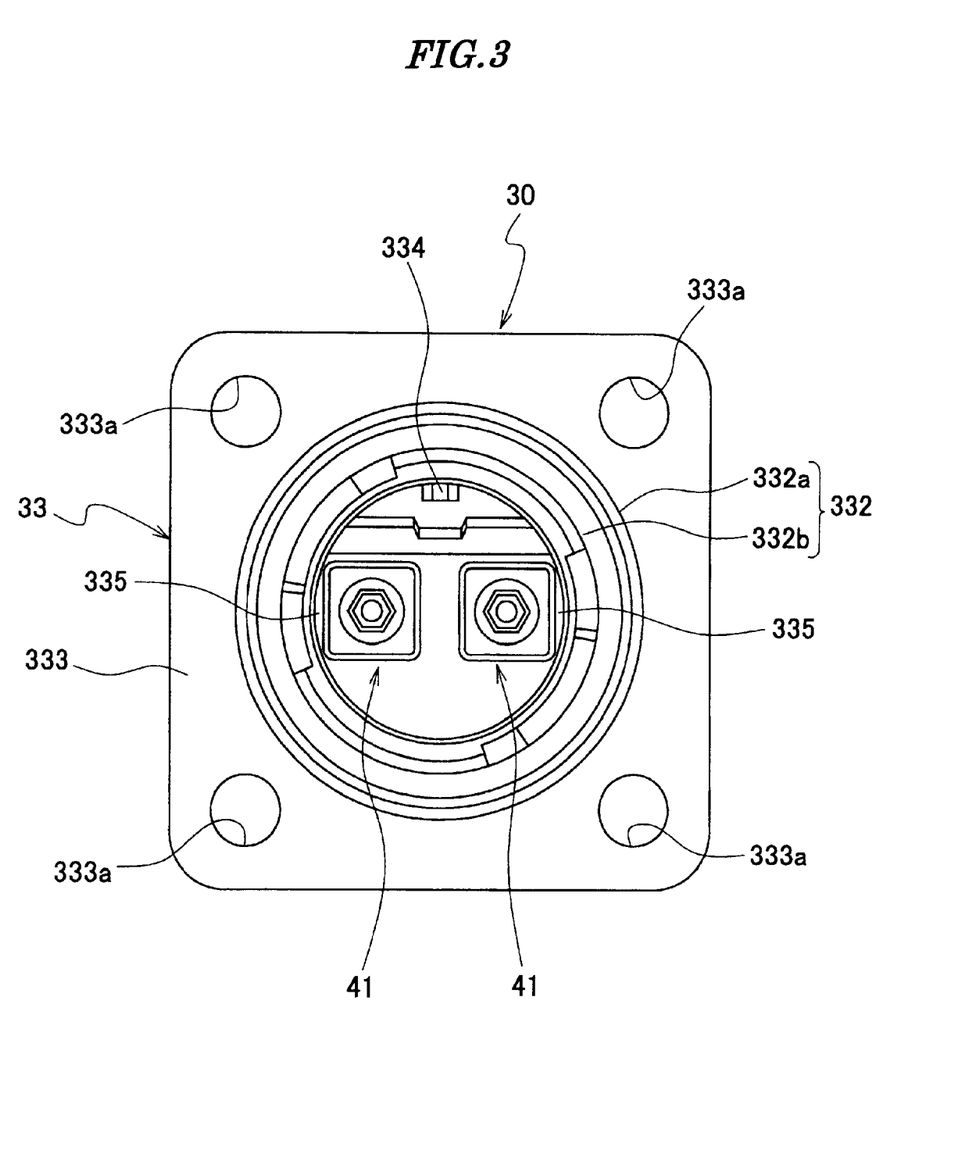
FIG. 3 is a front view of the receptacle adapter appearing in FIG. 1.
Figure 4:
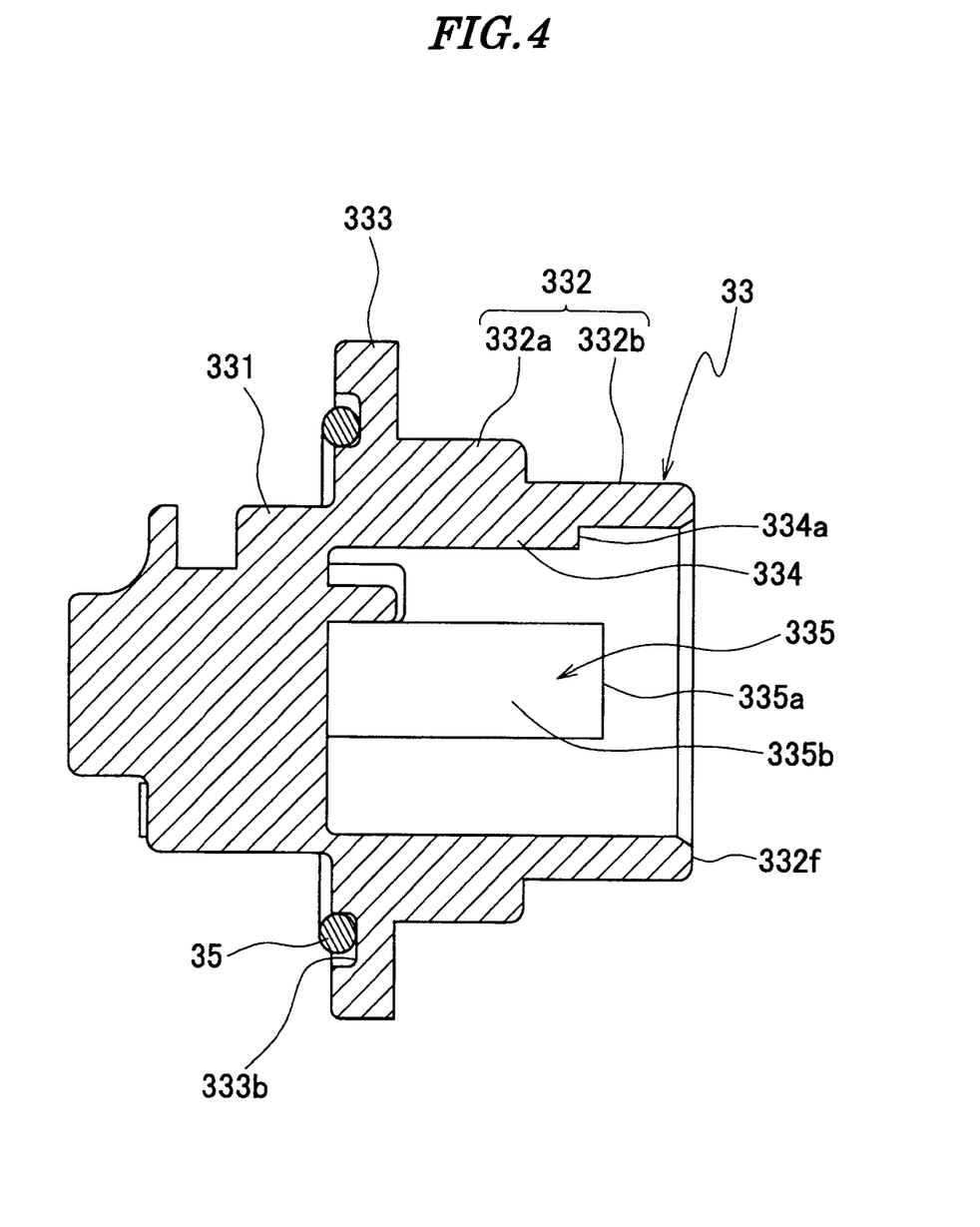
FIG. 4 is a cross-sectional view of a housing of the receptacle adapter of the adapter unit appearing in FIG. 1.

As shown in FIGS. 2, 3, and 4, the housing 33 includes a holding portion 331, a cylinder portion (first hollow cylindrical portion) 332, and a flange 333.

The holding portion 331 is substantially prism-shaped, and is formed with a pair of holding holes 331a for accommodating the two optical connectors 41. The pair of holding holes 331a communicate with an inner space of the hollow cylindrical portion 332.

The hollow cylindrical portion 332 includes a large-diameter portion 332a and a small-diameter portion 332b. The large-diameter portion 332a is continuous with the holding portion 331. The small-diameter portion 332b is continuous with the large-diameter portion 332a. The small-diameter portion 332b has an outer peripheral surface formed with a pair of recesses 332c. The pair of recesses 332c are arranged at equally-spaced intervals in a circumferential direction of the small-diameter portion 332b. Each recess 332c includes a guiding portion 332d and a locking portion 332e. The guiding portion 332d is substantially triangle-shaped. The locking portion 332e is continuous with a summit portion of the guiding portion 332d, and extends in the circumferential direction of the small-diameter portion 332b.

The hollow cylindrical portion 332 has an inner peripheral surface formed with a key 334. The key 334 projects toward a central axis of the hollow cylindrical portion 332, and extends along the central axis of the hollow cylindrical portion 332.

A front end 334a of the key 334 is at a location rearward of a front end 332f of the hollow cylindrical portion 332.

The inner peripheral surface of the hollow cylindrical portion 332 is formed with a pair of projecting portions 335. The pair of projecting portions 335 are at respective locations line-symmetrical with respect to the central axis of the hollow cylindrical portion 332. A cross-sectional shape of a surface of each projecting portion 335, which is orthogonal to the central axis of the hollow cylindrical portion 332, is substantially D-shaped. Each projecting portion 335 includes a receiving surface 335a and a flat surface (plane surface) 335b. The flat surfaces 335b of the two projecting portions 335 are opposed to each other via the central axis of the hollow cylindrical portion 332. Each flat surface 335b is parallel to the central axis of the hollow cylindrical portion 332, and is continuous with an inner surface of an associated one of the holding holes 331a. Further, each flat surface 335b is continuous with the inner peripheral surface of the hollow cylindrical portion 332.

The front end 334a of the key 334 is at a location rearward of the receiving surface 335a (see FIG. 4).

The flange 333 is rectangle-shaped, and is formed on the outer peripheral surface of the holding portion 331. The flange 333 has corners formed with mounting holes 333a. The flange 333 has a rear surface formed with an annular groove 333b. A seal member 35 is disposed in the annular groove 333b. The seal member 35 serve as a waterproof (seal) member, when the receptacle adapter 30 is mounted on a panel, not shown.

The pair of holding holes 331a of the holding portion 331 accommodate the optical connectors 41. As shown in FIG. 2, each optical connector 41 includes a ferrule 411, a tube portion (connector housing) 412, a slider 413, a spring holding portion 414, and a spring 415. The ferrule 411 is hollow cylinder-shaped, and receives and holds an optical fiber (formed by a core and a clad for covering the core) of an optical fiber cable. The tube portion 412 is hollow prism-shaped, and accommodates the ferrule 411, the slider 413, and the spring 415. The slider 413 is disposed in the tube portion 412 in a manner slidable in a longitudinal direction of the tube portion 412. The slider 413 holds the ferrule 411. When the slider 413 is positioned most forward, a front end of the ferrule 411 projects from the front end of the tube portion 412. A front portion of the spring holding portion 414 is inserted into the tube portion 412 and fixed therein. A rear portion of the spring holding portion 414 projects from the rear end of the tube portion 412. The front portion of the spring holding portion 414 accommodates the spring 415. The spring 415 urges the slider 413 forward.

Figure 5:
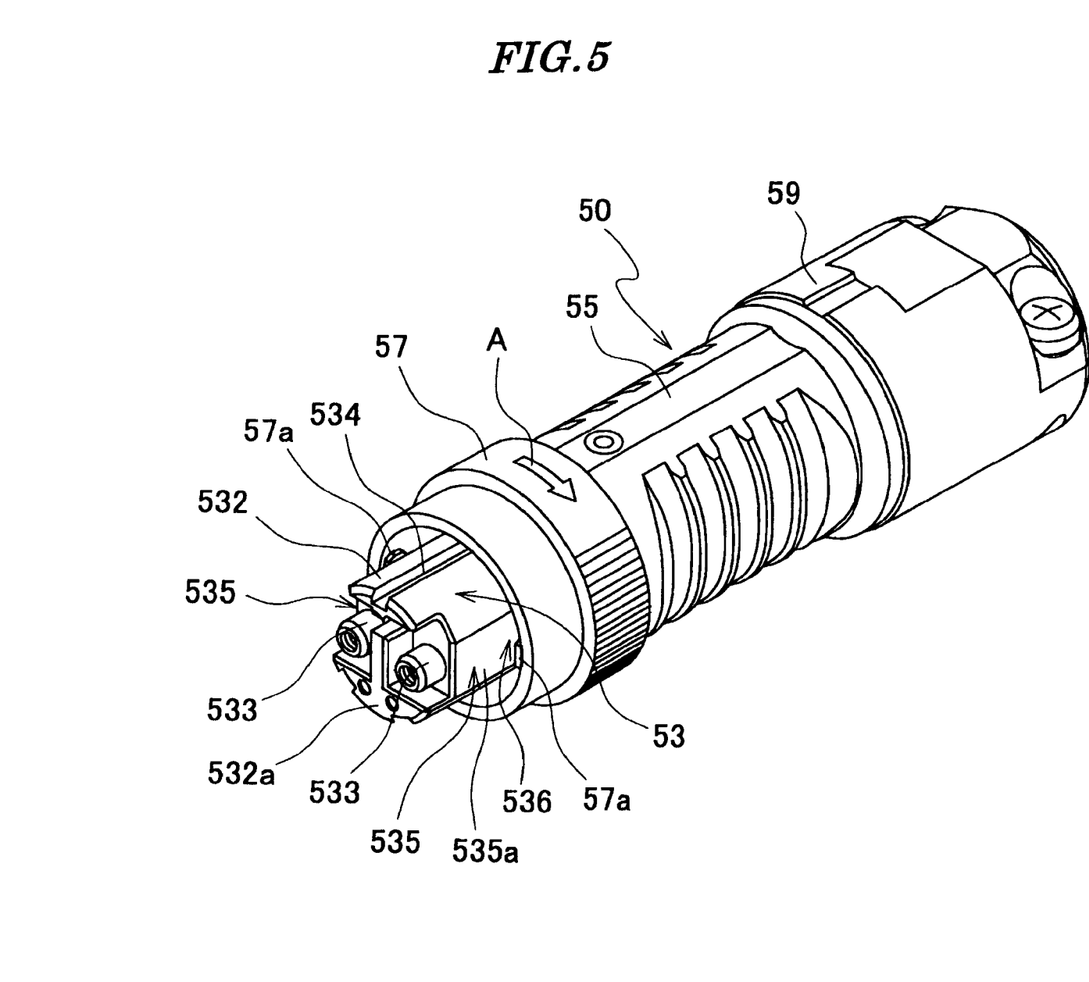
FIG. 5 is a perspective view of a plug adapter of the adapter unit shown in FIG. 1.

As shown in FIGS. 1 and 5, the plug adapter 50 is comprised of a housing 53, a barrel 55, a coupling nut 57, and an endbell 59.

Optical connectors, not shown, each include a ferrule and a split sleeve. The ferrule is cylinder-shaped, and receives and holds an optical fiber of an optical fiber cable. The split sleeve is substantially hollow cylinder-shaped, and a front part of the ferrule is inserted in the split sleeve.

The housing 53 includes a holding portion, not shown, and a hollow cylindrical portion (second hollow cylindrical portion) 532. The holding portion holds the ferrules. The hollow cylindrical portion 532 is continuous with the holding portion, and projects from the barrel 55. The hollow cylindrical portion 532 includes sleeve holding portions 533. Each sleeve holding portion 533 holds an associated one of the split sleeves, not shown. When the receptacle adapter 30 and the plug adapter 50 are fitted, the split sleeves held by the sleeve holding portions 533 receive the front parts of the ferrules 411 of the optical connectors 41 accommodated in the receptacle adapter 30, and brings the ferrules 411 into abutment with the ferrules of the optical connectors accommodated in the plug adapter 50.

The hollow cylindrical portion 532 has an outer peripheral surface formed with a key groove 534. The key groove 534 extends along a central axis of the hollow cylindrical portion 532.

The outer peripheral surface of the hollow cylindrical portion 532 is formed with a pair of flat portions (receiving portion) 535. The pair of flat portions 535 are at respective locations line-symmetrical with respect to the central axis of the hollow cylindrical portion 532. The pair of flat portions 535 each include a flat surface 535a, and one flat surface 535a and the other flat surface 535a are parallel to each other, and are parallel to the central axis of the hollow cylindrical portion 532. When the hollow cylindrical portion 532 of the plug adapter 50 is inserted into the hollow cylindrical portion 332 of the receptacle adapter 30, a space 536 is formed between each flat surface 535a and the inner peripheral surface of the hollow cylindrical portion 332. When the receptacle adapter 30 and the plug adapter 50 are fitted, the projecting portions 335 of the receptacle adapter 30 are accommodated in the spaces 536.

The barrel 55 accommodates and holds the holding portion of the housing 53.

The coupling nut 57 is substantially hollow cylinder-shaped, has a flange, not shown, on an inner peripheral surface thereof, and is rotatably mounted on the housing 53. The flange of the coupling nut 57 is sandwiched by a flange, not shown, which is formed on an outer peripheral surface of the housing 53 and a front end surface of the barrel 55. This prevents the coupling nut 57 from coming off from the housing 53. The coupling nut 57 is urged by a spring, not shown, in a direction opposite from a direction of an arrow A marked on an outer peripheral surface of the coupling nut 57.

The endbell 59 is mounted on a rear part of the barrel 55, and holds the optical fiber cable.

To fit the plug adapter 50 into the receptacle adapter 30, first, the hollow cylindrical portion 532 of the plug adapter 50 is inserted into the hollow cylindrical portion 332 of the receptacle adapter 30. At this time, the hollow cylindrical portion 532 inserted in the hollow cylindrical portion 332 is received by the receiving surfaces 335a of the projecting portions 335, so that only the front end of the hollow cylindrical portion 532 is inserted into the hollow cylindrical portion 332.

Next, the hollow cylindrical portion 532 is turned until the projecting portions 335 and the flat portions 535 match each other. The front end 334a of the key 334 is at a location rearward of the receiving surfaces 335a of the projecting portions 335. This prevents, when the hollow cylindrical portion 532 is turned, the front end 334a of the key 334 from being brought into contact with the front end 532a of the hollow cylindrical portion 532. When the projecting portions 335 and the flat portions 535 match each other, the engagement of the front end surface 532a of the hollow cylindrical portion 532 and the receiving surfaces 335a is released, so that the key 334 and the key groove 534 are opposed to each other in a inserting direction I. By pushing the hollow cylindrical portion 532 into the hollow cylindrical portion 332 at this time, the entire hollow cylindrical portion 532 is inserted into the hollow cylindrical portion 332. It should be noted that when the key 334 and the key groove 534 match each other, play between the receptacle adapter 30 and the plug adapter 50 is reduced.

When the entire hollow cylindrical portion 532 is inserted into the hollow cylindrical portion 332, protrusions 57a of the coupling nut 57 enter the recesses 332c of the hollow cylindrical portion 332, and are guided to the locking portions 332e by the guiding portions 332d of the recesses 332c. At this time, the protrusions 57a are urged in the circumferential direction by the side edges of the guiding portions 332d of the recesses 332c, whereby the coupling nut 57 is turned, and the spring, not shown, which is connected to the coupling nut 57 is compressed. When the protrusions 57a enter the locking portions 332e, the protrusions 57a are released, and are pressed against one ends of the locking portions 332e by the spring force of the spring which is connected to the coupling nut 57. As a result, the protrusions 57a are fixedly engaged with the hollow cylindrical portion 332, whereby the plug adapter 50 is locked to the receptacle adapter 30.

To remove the plug adapter 50 from the receptacle adapter 30, it is only required to turn the coupling nut 57 of the plug adapter 50 in the direction of the arrow A marked on the outer peripheral surface of the coupling nut 57 against the spring force, thereby release the protrusions 57a from the locking portions 332e, and then pull the plug adapter 50.

According to the present embodiment, when the hollow cylindrical portion 532 is inserted into the hollow cylindrical portion 332, and is turned, the front end 334a of the key 334 is not brought into contact with the front end 532a of the hollow cylindrical portion 532, which makes it possible to prevent the key 334 from being broken.

Further, since each projecting portion 335 is formed with the flat surface 335b, the receiving surface 335a can be made wider, which contributes to prevention of breakage or the like of the key 334.

Further, since the flat surface 335b of each projecting portions 335 is continuous with the inner surface of the associated holding hole 331a, even if the projecting portions 335 are formed, it is possible to prevent the receptacle adapter 30 from being increased in size.

Furthermore, since it is easy to manufacture the flat surface 335b of each projecting portion 335, and it is not required to manufacture the projecting portion 335 with higher dimensional accuracy than the key 334, it is possible to make the manufacturing costs lower than those of the conventional adapter which is provided with a plurality of keys.

It should be noted that although in the present embodiment, the projecting portions 335 are at locations line-symmetrical with respect to the central axis of the inner peripheral surface of the hollow cylindrical portion 332, and the key 332 is at an intermediate location between the two projecting portions 335, for example, another projecting portion 335 may be formed on the inner peripheral surface of the hollow cylindrical portion 332, at a location opposite to the key 334. This makes it possible to more easily perform the operation for causing the key 334 and the key groove 534 to match each other.

Further, although in the present embodiment, the flat surface 335b of each projecting portion 335 is continuous with the inner surface of the associated holding hole 331a, and further, the flat surface 335b is continuous with the inner peripheral surface of the hollow cylindrical portion 332, the shape of the projecting portion 335 is not limited to that in the embodiment, but, for example, the shape thereof may have a prism shape, a cylinder shape, a circular cone shape or the like.

Next, a description will be given of a housing 2033 of a variation of the receptacle adapter 30 of the adapter unit 10 shown in FIG. 1 with reference to FIG. 6. Component parts identical to those of the housing 33 of the receptacle adapter 30 in FIG. 1 are denoted by identical reference numerals, and detailed description thereof is omitted.

Figure 6:
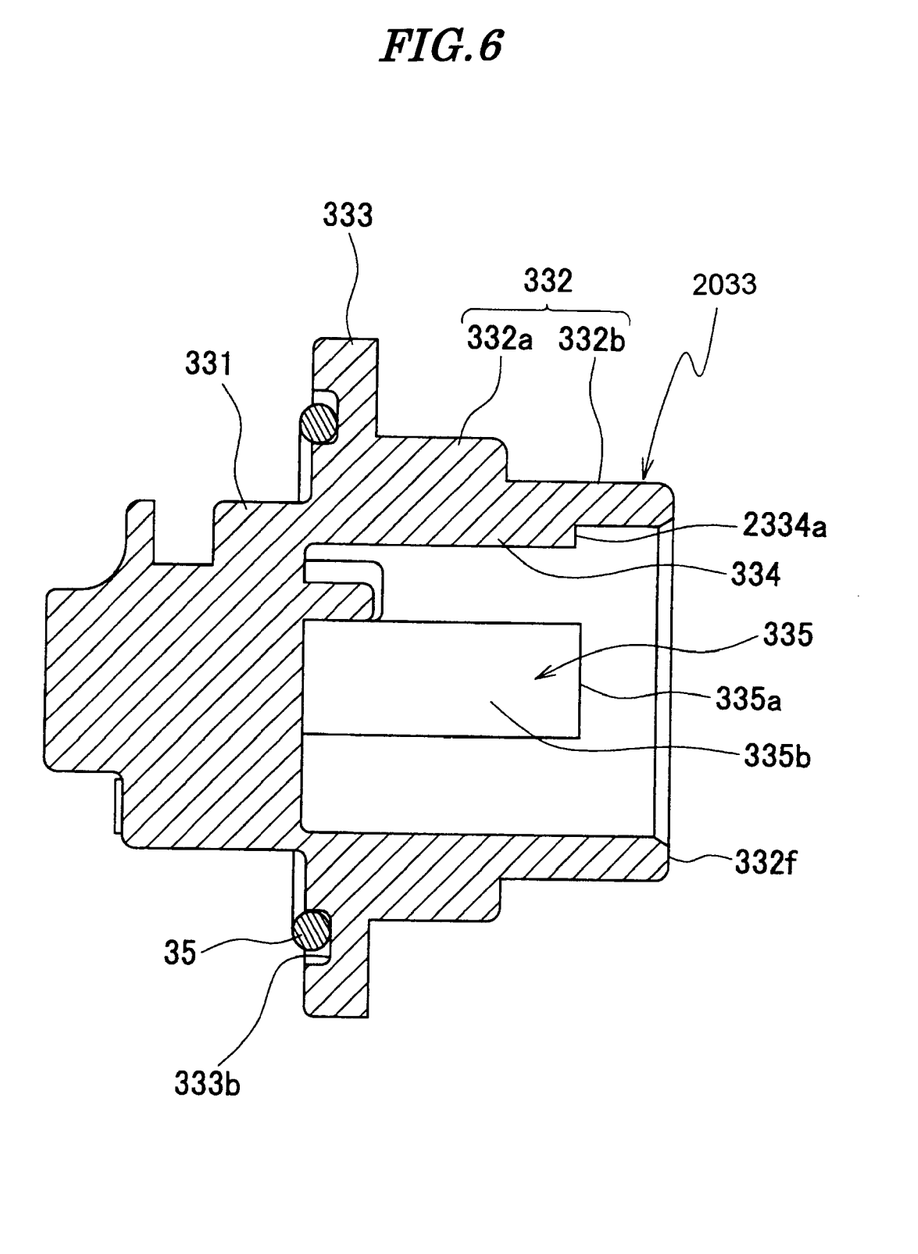
FIG. 6 is a cross-sectional view of a housing of a variation of the receptacle adapter of the adapter unit shown in FIG. 1.

As shown in FIG. 6, in a direction which is parallel to the central axis of the hollow cylindrical portion 332, a front end 2334*a* of the key 334 and the receiving surface 335*a* of each projecting portion 335 match in position. In this variation, if the hollow cylindrical portion 532 is inserted into the hollow cylindrical portion 332, and is turned, only in a case where the key 334 and the key groove 534 are matched, the entire hollow cylindrical portion 532 can be inserted in the hollow cylindrical portion 332. Therefore, this makes it easier to cause the key 334 and the key groove 534 to match each other.

It is further understood by those skilled in the art that the foregoing are the preferred embodiments of the present invention, and that various changes and modification may be made thereto without departing from the spirit and scope thereof.

What is claimed is:

1. An adapter unit comprising:
 a first adapter comprising:
  a holding portion provided with a pair of retention holes of rectangular cross-section for accommodating a pair of optical connectors;
  a first cylindrical portion having an internal space communicating with said pair of retention holes, said first cylindrical portion being connected to a front end of said holding portion;
  at least one key formed on an inner peripheral surface of said first cylindrical portion so as to extend along a central axis of said first cylindrical portion; and
  a pair of projecting portions formed on the inner peripheral surface of said first cylindrical portion; and
 a second adapter comprising:
  a second cylindrical portion which is insertable into said first cylindrical portion;
  a key groove formed in an outer peripheral surface of said second cylindrical portion, said key groove being adapted to be fitted to said key along the central axis of said first cylindrical portion; and
  a pair of receiving portions formed on the outer peripheral surface of said second cylindrical portion and being adapted to receive said pair of projecting portions;
wherein:
two corners of each of said retention holes are in contact with the inner peripheral surface of said first cylindrical portion;
a front end of said key is located behind a front end of said first cylindrical Portion;
said pair of projecting portions are positioned symmetrically about the central axis of said first cylindrical portion, each of said pair of projecting portions having a level surface and a receiving surface connected to the level surface;
said level surface is flush with one inner surface of a corresponding one of said pair of retention holes; and
said receiving surface is located between the front end of said key and the front end of said first cylindrical portion and receives a front end surface of said second cylindrical portion when said second cylindrical portion is inserted into said first cylindrical portion.

* * * * *